UNITED STATES PATENT OFFICE.

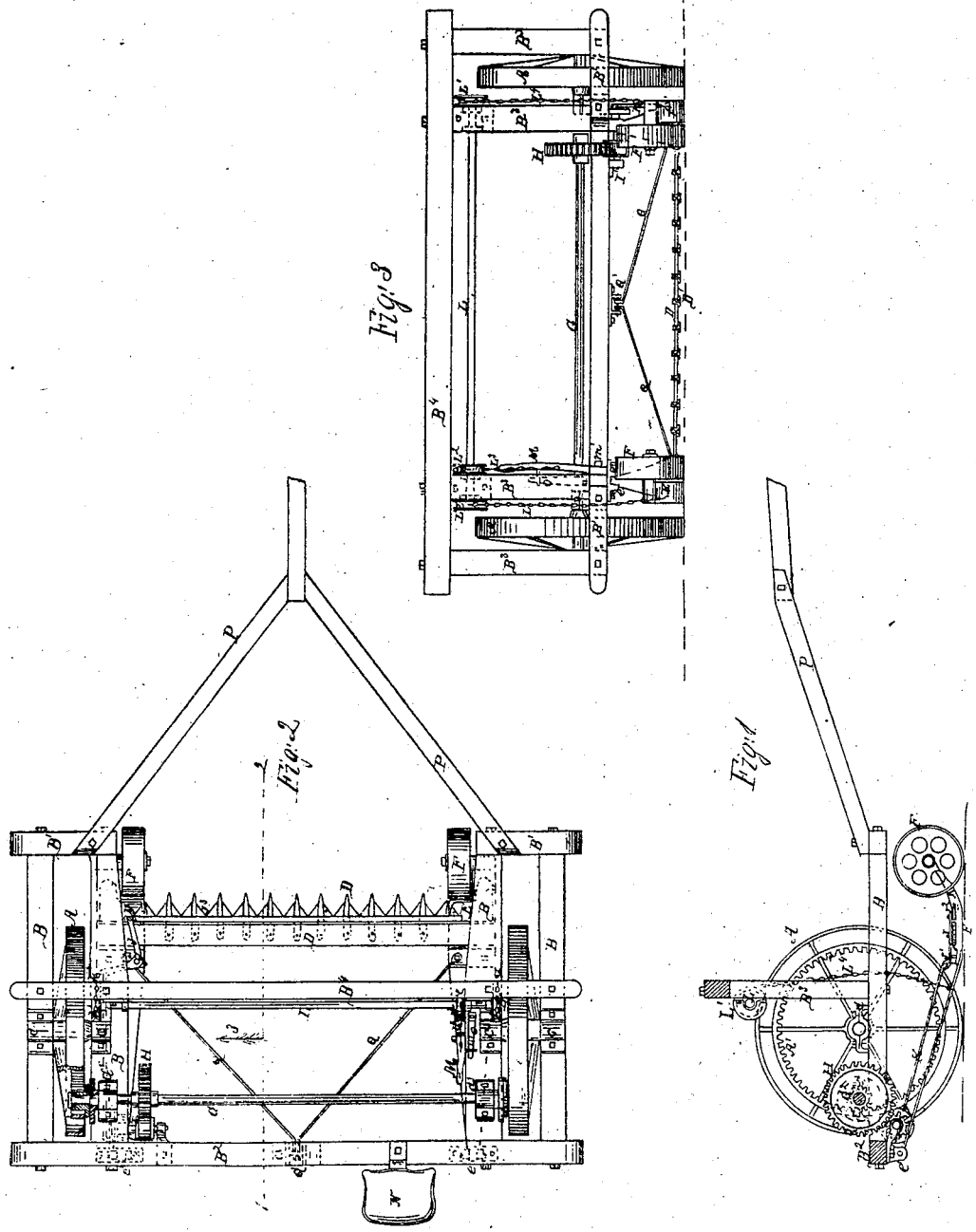

JOHN B. TINKER, OF BUFFALO, NEW YORK.

IMPROVEMENT IN MOWING-MACHINES.

Specification forming part of Letters Patent No. 51,364, dated December 5, 1865.

*To all whom it may concern:*

Be it known that I, JOHN B. TINKER, of the city of Buffalo, county of Erie, and State of New York, have invented certain new and useful Improvements in Mowing - Machines; and I do hereby declare that the following is a full, clear, and exact description of the construction and operation thereof, reference being had to the accompanying drawings, making a part of this specification, in which—

Figure I is a sectional side elevation of my improved machine, said section being taken on the line 1 2 of Fig. II, and seen in the direction of the arrow 3. Fig. II is a plan, and Fig. III is a front elevation, of same.

The nature of this invention consists in constructing a mowing-machine for mowing grass with two driving-wheels located one at each end of the cutting apparatus, so that one horse and one driving-wheel will travel in the standing grass and the other on the mown grass in going in one direction, and vice versa in going in the other direction, so that a field of grass may be cut by parallel swarths working from one side of the field only.

Letters of like name and kind refer to like parts in each of the figures.

A A represent the driving-wheels placed at a proper distance apart to permit the location of the cutting apparatus between them, and their axes being directly in line with each other.

The frame-work by which the driving-wheels are retained in position and the various parts of the machine supported consists of the fore- and -aft timbers B, one at each side of each wheel, being framed together in front in pairs by the short cross-pieces B' and at the back the same, but by a long cross-piece, B², which connects the two pairs together. The journal-boxes C of the driving-wheel axles are bolted to the timbers B, as represented.

The timbers B are further connected together by a framing consisting of the vertical posts B³ and the long cross-timber B⁴, the posts raising the cross-timber to such a height as not to interfere with the falling grass.

D represents the finger-bar carrying the guard-fingers D', through which the cutters work, and located between and in front of the the driving-wheels. It is supported by the shoes E at each end, which are extended upward and backward and hinged to the rear cross-piece, B², as shown at e'. The shoes also carry rollers F in front of the finger-bar, which run upon the ground and sustain the weight of the finger-bar.

G represents a pinion-shaft extending across from one driving-wheel to the other, running in journal-boxes G', and carrying at each end a pinion, G², gearing with the cog-rims A' on the driving-wheels. These pinions are loose upon the shaft, but are caused to revolve with it when the machine is moving forward by ratchet-wheels and pawls, the ratchet-wheels being connected to the pinions and the pawls to disks keyed upon the shaft, the device being a common one in mowing-machines. When the machine is backed the pinions revolve without turning the shaft, and consequently without giving motion to the cutting apparatus.

H represents a spur-wheel keyed on the shaft G, which gears with a pinion, I, on the parallel crank-shaft I' and gives motion thereto.

J represents a bell-crank or right-angled lever having its fulcrum at J' on one of the shoes E, one arm of the lever connecting with the wrist J² on the end of the cutter-bar J³, the other being connected by the connecting-rod K to the crank of the crank-shaft I', so that the revolution of the crank-shaft gives the proper reciprocating motion to the cutters.

L represents a horizontal shaft running transversely across the machine above the driving-wheels, having its bearings secured to the inside vertical posts, B³, of the frame-work, and carrying at each end a small chain-wheel or pulley, L', from which wheels chains L⁴ lead downward through the inside timbers, B, and connect to the shoes E.

L² represents a third chain-wheel on the shaft L, from which a chain, L³, leads to the hand-lever M, having its fulcrum at m' on one of the inside timbers, B. The position of this lever is such that the driver, sitting upon his seat N, can reach it, and by drawing toward him unwind the chain from the wheel L², which will wind up the chains L⁴ on the wheels L', and raise the finger-bar and cutters from the ground to pass over obstructions.

O represents a stiff steel spring bolted to the timber B, the free end bearing against the lever M, the stiffness of the spring being so regulated that it will bear against the lever with sufficient force to cause the chains to sustain a large portion of the weight of the finger-bar and cutting apparatus and throw it upon the driving-wheels, making the draft of the machine much lighter than if the finger-bar dragged upon the ground, while at the same time its flexibility will allow the unbalanced weight of the finger-bar to cause it to follow the inequalities of the ground, and cut the grass as closely as may be desired.

P represents the draft-pole, which is forked so as to allow its connection to both ends of the frame of the machine in front of the driving-wheels, giving additional strength and support to the frame, and at the same time leaving the space in front of the cutting apparatus unobstructed by any device which would bear down or press forward the standing or uncut grass.

Each horse travels directly in front of a driving-wheel, a long neck-yoke and evener being used to permit them so to do, so that the whole space in front of the cutting apparatus is open and clear to the view of the driver sitting on his seat N, located on the back cross-timber, $B^2$.

This machine is intended to mow backward and forward in parallel swaths, working continually from the same side of the field.

As the machine travels in one direction one horse and driving-wheel must travel in the standing grass, and the other horse and wheel on the mowed grass, and vice versa when going in the opposite direction, so that the standing grass which is tread down by the passage of the machine in one direction is cut by the machine when moving in the reversed direction, the direction of the machine thus being brought opposite to that in which the grass is trodden down by the previous passage of the machine.

Q represents diagonal braces running one from each shoe and meeting at the back timber, $B^2$, to which they are hinged, as shown at Q' in rear of the center of the finger-bar.

These braces serve a double purpose—first, giving strength and rigidity to the finger-bar; and, second, clearing a track for the passage of the driving-wheel running on the mowed ground.

Having described my invention, what I claim, and desire to secure by Letters Patent, is—

1. In a mowing-machine having two driving-wheels so arranged that one horse walks in the standing grass when mowing, supporting and holding the finger-bar at both ends by means of the extended and hinged shoes E, in combination with so locating the finger-bar and cutters that the cutters will do their work within or between the track of the two driving-wheels.

2. The combination of the carrying-rollers F with the hinged and extended shoes E, arranged and located substantially as herein described.

3. The arrangement of the hand-lever M, chain-wheels $L' L^2$, chains $L^3, L^4$, and supporting frame-posts $B^3$, as herein described, so that power may be conveniently applied simultaneously and equally at both ends of the cutting apparatus for raising it to pass obstructions.

4. The combination and arrangement of the spring O with the hand-lever M, chain-wheels $L'$, $L^2$, and chains $L^3 L^4$, for the purposes and substantially as described.

JOHN B. TINKER.

Witnesses:
GEO. W. WALLACE,
W. H. FORBUSH.